(12) United States Patent
Wong et al.

(10) Patent No.: US 8,229,172 B2
(45) Date of Patent: Jul. 24, 2012

(54) ALGORITHMS FOR ESTIMATING PRECISE AND RELATIVE OBJECT DISTANCES IN A SCENE

(75) Inventors: Earl Wong, San Jose, CA (US);
Pingshan Li, Sunnyvale, CA (US);
Mamoru Sugiura, Yokohama (JP);
Maikibi Nakamura, Tokyo (JP);
Hidenori Kushida, Tokyo (JP);
Yoshihiro Murakami, Atsugi (JP);
Soroj Triteyaprasert, Bangkok (TH)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 371 days.

(21) Appl. No.: 12/639,841

(22) Filed: Dec. 16, 2009
(Under 37 CFR 1.47)

(65) Prior Publication Data

US 2011/0142287 A1    Jun. 16, 2011

(51) Int. Cl.
*G06K 9/00*    (2006.01)
(52) U.S. Cl. ...................................... 382/106; 382/154

(58) Field of Classification Search .................. 382/106, 382/154, 255
See application file for complete search history.

(56) References Cited

U.S. PATENT DOCUMENTS

| | | | |
|---|---|---|---|
| 6,229,913 B1 | 5/2001 | Nayar et al. | 382/154 |
| 2001/0033327 A1 | 10/2001 | Uomori et al. | 348/47 |
| 2007/0016425 A1 | 1/2007 | Ward | 704/271 |
| 2007/0036427 A1 | 2/2007 | Nakamura et al. | 382/154 |
| 2007/0189750 A1 | 8/2007 | Wong et al. | 396/121 |
| 2010/0194971 A1* | 8/2010 | Li et al. | 348/349 |
| 2010/0310176 A1* | 12/2010 | Lin et al. | 382/195 |

FOREIGN PATENT DOCUMENTS

WO    2007022329 A2    2/2007

* cited by examiner

*Primary Examiner* — Andrew W Johns
(74) *Attorney, Agent, or Firm* — Haverstock & Owens LLP (57) ABSTRACT

A two picture matching curve information is able to be used to determine precise object distance or relative object distance in a scene. Acquiring two images with different blur information in addition to the curve information enables a device to determine distance information of objects in a scene. The distance information is able to be used in image processing including generating a depth map which is then able to be used in many imaging applications.

40 Claims, 8 Drawing Sheets

ALGORITHMS FOR ESTIMATING PRECISE AND RELATIVE OBJECT DISTANCES IN A SCENE

FIELD OF THE INVENTION

The present invention relates to the field of image processing. More specifically, the present invention relates to determining object distances in a scene.

BACKGROUND OF THE INVENTION

A Depth Map (DM) is a map that shows the distance from the camera sensor to a corresponding point in the scene for every single pixel. Traditional methods of DM generation include range sensors that use acoustic waves or project laser patterns or scan the scene with some other means to measure the distance from the camera, and stereoscopic systems, that use two or more cameras/lenses to acquire multiple images of the scene and then match them in order to triangulate the points in the scene. In both cases, single-lens cameras require additional hardware to generate the DM.

SUMMARY OF THE INVENTION

A two picture matching curve information is able to be used to determine precise object distance or relative object distance in a scene. Acquiring two images with different blur information in addition to the curve information enables a device to determine distance information of objects in a scene. The distance information is able to be used in image processing including generating a depth map which is then able to be used in many imaging applications.

In one aspect, a method implemented on a device comprises acquiring a first image of a scene, acquiring a second image of the scene and utilizing curve information to determine a device-to-object distance of an object in the scene. The curve information is precalculated. Utilizing the curve information includes: determining a number of convolutions used to blur one of the first image and the second image to a blurriness of the other of the first image and the second image, using the number of convolutions to determine an object-to-focus position distance based on the curve information, computing a device-to-focus position distance and adding the object-to-focus position distance and the device-to-focus position distance to determine the device-to-object distance. The curve information includes multiple curves. The method further comprises generating the curve information. Generating the curve information includes acquiring multiple images at different blur quantities. The first image and the second image have a different blur amount. The different blur amount is achieved by changing the focus position between acquiring the first image and the second image. The method further comprises generating a depth map. The method further comprises storing the depth map. The method further comprises utilizing the depth map to perform an application. The application is selected from the group consisting of auto focus, auto exposure, zoom setting, aperture setting, flash setting, shutter speed, white balance, noise reduction, gamma correction, motion estimation, image/video compression, generating blur, quality improvement, generating a 3-D image, shadow removal and object segmentation. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an IPod®, a video player, a DVD writer/player, a television and a home entertainment system.

In another embodiment, a system implemented on a device configured for determining distances of objects in an image comprises an image acquisition module configured for acquiring a first image and a second image, a curve generation module operatively coupled to the image acquisition module, the curve generation module configured for generating curve information and a distance calculation module operatively coupled to the curve generation module, the distance calculation module configured for calculating a device-to-object distance of an object within the image. The distance calculation module utilizes the curve information by: determining a number of convolutions used to blur one of the first image and the second image to a blurriness of the other of the first image and the second image, using the number of convolutions to determine an object-to-focus position distance based on the curve information, computing a device-to-focus position distance and adding the object-to-focus position distance and the device-to-focus position distance to determine the device-to-object distance. The curve information is determined by acquiring target data of multiple images at different blur quantities. The curve information includes multiple curves. The first image and the second image have a different blur amount. The different blur amount is achieved by changing the focus position between acquiring the first image and the second image. The system further comprises a depth map generation module operatively coupled to the distance calculation module, the depth map generation module configured for generating a depth map. The depth map is stored. The depth map is utilized to perform an application. The application is selected from the group consisting of auto focus, auto exposure, zoom setting, aperture setting, flash setting, shutter speed, white balance, noise reduction, gamma correction, motion estimation, image/video compression, generating blur, quality improvement, generating a 3-D image, shadow removal and object segmentation. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an IPod®, a video player, a DVD writer/player, a television and a home entertainment system.

In another aspect, a device comprises a memory for storing an application, the application configured for acquiring a first image of a scene, acquiring a second image of the scene and utilizing curve information to determine a distance of one or more objects in the scene and a processing component coupled to the memory, the processing component configured for processing the application. Utilizing the curve information includes determining a number of convolutions used to blur one of the first image and the second image to a blurriness of the other of the first image and the second image, using the number of convolutions to determine an object-to-focus position distance based on the curve information, computing a device-to-focus position distance and adding the object-to-focus position distance and the device-to-focus position distance to determine the device-to-object distance. The curve information is predetermined. The curve information includes multiple curves. The application is further configured for generating the curve information. Generating the curve information includes acquiring multiple images at different blur quantities. The first image and the second image have a different blur amount. The different blur amount is achieved by changing the focus position between acquiring the first image and the second image. The application is further configured for generating a depth map. The depth map is stored. The application is further configured for utilizing the depth map to perform an imaging application. The imaging application is selected from the group consisting of auto focus, auto exposure, zoom setting, aperture setting, flash setting, shutter speed, white balance, noise reduction, gamma correction, motion estimation, image/video compression, generating blur, quality improvement, generating a 3-D image, shadow removal and object segmentation. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an IPod®, a video player, a DVD writer/player, a television and a home entertainment system.

In another aspect, a method of generating curve information on a device comprises acquiring a first image and a second image of a test object in a scene with a changed focus position for the second image, computing a change in blur between the first image and the second image and repeating a and b for a plurality of different focus positions to generate the curve information. The method further comprises identifying the test object in the scene. The image of the test object is acquired for a fixed zoom and aperture. Generating the curve information occurs while calibrating the device. The curve information is stored on the device. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an IPod®, a video player, a DVD writer/player, a television and a home entertainment system.

DETAILED DESCRIPTION OF THE PREFERRED EMBODIMENT

Computing object distances in a scene using a mathematical formulation based on a simple lens model has been described previously. The inputs to this mathematical formulation are intrinsic camera parameters such as focal length, aperture size and other information as well as two picture matching curve information.

Instead of using the mathematical formulation described previously, the two picture matching curve information is able to be used to determine precise object distance or relative object distance in a scene.

A two picture matching curve is a physical quantity computed from data captured by any imaging device that employs a Charge-Coupled Device (CCD) or Complimentary Metal-Oxide-Semiconductor (CMOS) sensor. A specific point on the two picture matching curve is generated in the following manner. For a fixed camera zoom and aperture, a picture of a test target or object is captured for a specific camera focus position. Next, the camera focus position is changed by some small quantity and a second picture is captured. The change in blur is then computed for the test target or object. The process is then repeated for different camera focus positions, thereby generating a two picture matching curve. If the neighboring camera focus positions are repeatedly changed by some fixed quantity corresponding to M depths of field (where M is a non-zero rational quantity), the computed two picture matching curve is theoretically linear, when a Gaussian convolution kernel is applied. Otherwise, the curve is monotonically increasing/decreasing. Due to imperfections in the camera lens, linearity only exists for a fixed range, even if the camera focus position is changed by a fixed M depth of field for each new camera focus position relative to its previous camera focus position.

Figure 1:
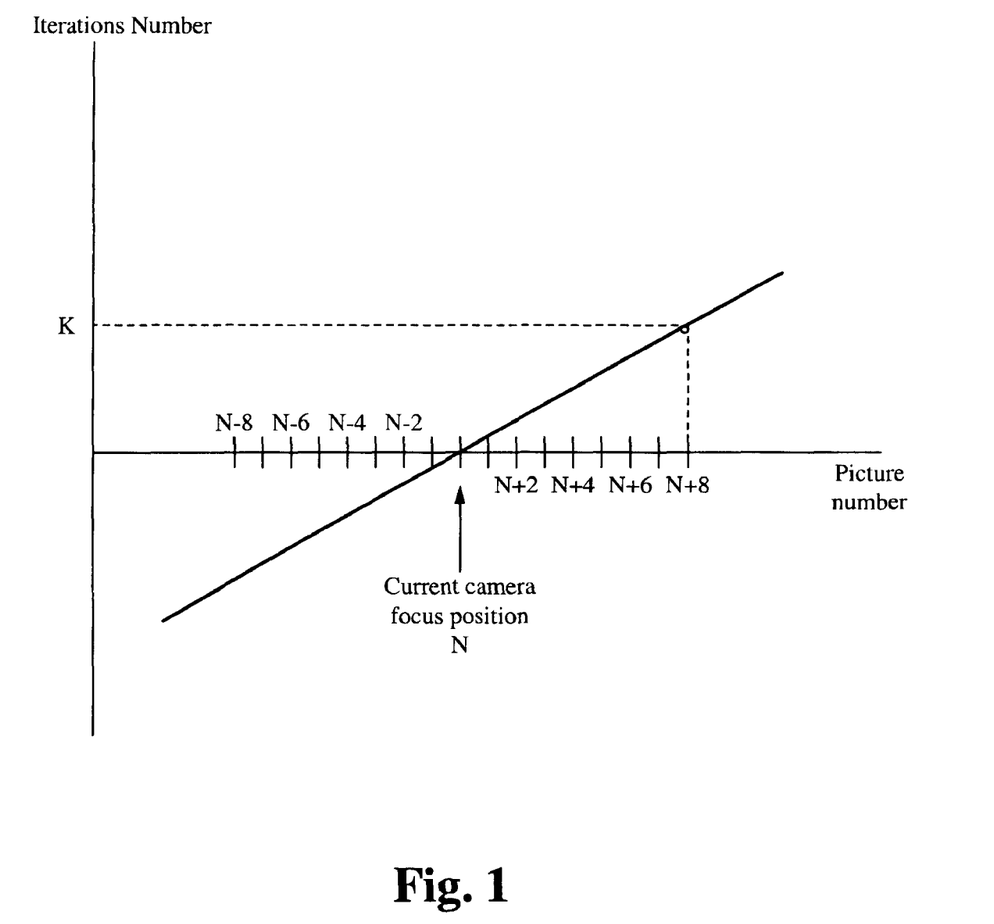
FIG. 1 illustrates a graph of a curve according to some embodiments.

An example of a captured two picture matching curve is shown in FIG. 1. The horizontal axis is defined to be a picture number while the vertical axis is defined to be iterations number (=convolutions). The picture number references the captured pictures (associated with different camera focus positions).

In a natural scene, an iteration is computed and associated with non-overlapping regions in the scene. The number is able to then be used to determine the relative order of the objects in a scene (e.g. which objects are closer to the camera and which objects are farther), or to approximate the actual distance of the objects in the scene. The matrix containing the iteration information is defined to be an iteration map.

Determining Relative Object Distance:

For example, a scene in question has the following rudimentary 3×3 iteration map.

$$\begin{matrix} -5 & 3 & 1 \\ 2 & 8 & 6 \\ 4 & -7 & 3 \end{matrix}$$

If the upper left corner of the matrix is defined to be entry (1, 1), and the lower right corner of the matrix is defined to be entry (3, 3), the object located at entry (2, 2) corresponds to iteration map number 8. This object is the closest to the camera. Similarly, the object located at entry (3, 2) corresponding to iteration map number −7 is furthest from the camera. Similarly, the object located at entry (1, 3) corresponding to iteration map number 1 is closest to the current focus position of the camera.

The dimensions of the iteration map are n×m. In addition, the iteration map often contains non-overlapping regions that contain two distinct depths (such as a foreground object and a background object) corresponding to border regions. At these locations, the iteration map information is inaccurate. In general, a rudimentary filtering or clustering scheme is able to be used to improve the iteration map estimate at the non-border locations. The information in the iteration map is able to then be used to determine relative and precise object distances. However, by employing a simple clustering algorithm, the relative object distance is able to be determined, assuming the object in question comprises several non-overlapping regions/multiple neighboring entries in the iteration map.

Determining Precise Object Distance:

If each adjacent camera position corresponds to a movement of M depths of field, then the iterations number is able to be used to compute the object distance. This is illustrated in FIG. 1.

In FIG. 1, the iterations number for the object in question at the current focus position is K. By way of illustration, the two picture matching curve associated with the current focus position is shown in FIG. 1. Using the curve, K corresponds to a picture number that is [(N+8)−N]=8 away from the current camera focus position. The distance of the object is then able to determined to be 8*M depths of field.

Each successive picture number location is computed from a mathematical formula. One possibility is to compute each successive picture number location as the forward [or rear] depth of field location from some reference picture number 1 [or Nmax], or some other picture number in between 1 and Nmax. The code shown below (where sign(depth_of_fields)==1), is able to be applied to compute the object location using the current camera focus position. Each new camera focus position is computed by substituting the newly computed forward depth of field location. In the example given below, the camera focal length, fnumber and starting focus distance (corresponding to picture number N=1) are 63 mm, 5.2, and 1 cm, respectively. The process is iterated 8 times in order to determine the object distance.

```
flength_check = 63/1000; % unit of meters
fnumber = 5.2
%coc of camera - 0.18 % unit of millimeters
distance_focus = 1; % unit of centimeters
depth_of_fields = 8;
H = ((flength * 100)^2) / (fnumber * 0.0018); % all units now in cm
Dno = (H*distance_focus) / H+distance_focus);
Dfo = (H*distance_focus) / H−distance_focus);
if sign(depth of fields) == 1
    Dnew1 = Dfo;
    s_new = distance_focus; % Dfo;
    for loop_dof = 1:abs(depth_of_fields),
        Dnew1 = (H * s_new) / (H − s_new);
        s_new = Dnew1;
        distance1(loop_dof) = s_new;
    end
elseif sign (depth_of_fields) == −1
    %Dnew1 = Dno;
    s_new = distance_focus;
    for loop_dof = 1:abs (depth_of_fields)
        Dnew1 = (H * s_new) / (H + s_new);
        s_new = Dnew1;
        distance2(loop_dof) = s_new;
    end
else
    aa = 11111111111111111111111
end
```

Similarly, the rear depth of field locations are able to be computed and used. In this case, the distance_focus=H/2 [corresponding to N=Nmax] and the sign(depth_of_fields) option is selected to be =−1.

Similarly, the new picture number locations are able to be computed in the forward direction based on the "textbook" depth of field definition. Here, distance_focus=1, and both Dno1 and Dfo1 are computed using the above formulas. In order to compute the next focus position corresponding to the next picture number location, the following equation is then solved.

$Dno2=Dfo1;$ $distance\_focus2=(Dno2*H)/(H−Dno2);$

The process is repeated to generate all subsequent distance focus positions.

$Dfo2=(H*distance\_focus2)/(H−distance\_focus2);$ $Dno3=Dfo2;$

Similarly, the new picture number locations are computed in the reverse direction based on the "textbook" depth of field definition. Here, distance_focus=H/2, and both Dno1 and Dfo1 are computed using the above formulas. In order to compute the next focus position corresponding to the next picture number location, then the following equation is solved.

$Dfo2=Dno1;$ $distance\_focus2=(Dfo2*H)/(H+Dfo2);$

The process is repeated to generate all subsequent distance focus positions.

$Dno2=(H*distance\_focus2)/(H+distance\_focus2);$ $Dfo3=Dno2;$

Other variants of the formulas and definitions are also able to be used.

The picture number locations are computed using a predetermined mathematical formula. By iterating the mathematical formula, the object depth associated with a specific iterations number is then able to be determined.

Figure 2A:
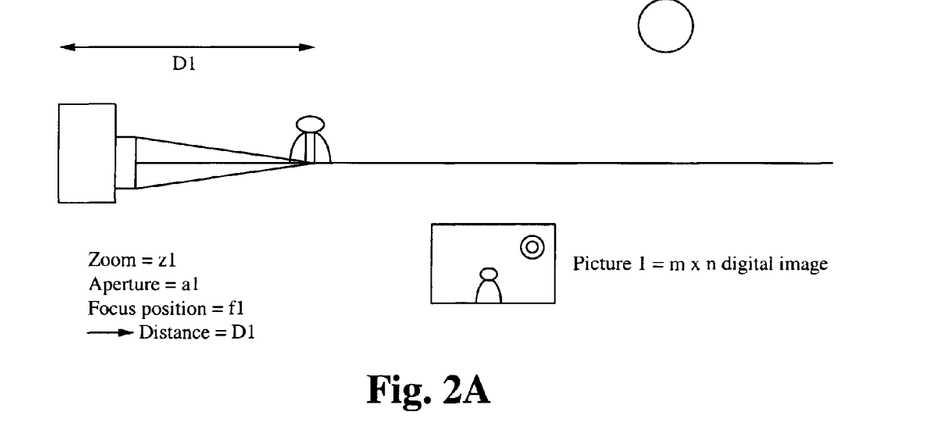
FIGS. 2A-B illustrate a diagram of a camera acquiring a picture according to some embodiments.

FIG. 2A illustrates a diagram of a camera acquiring a picture according to some embodiments. A camera viewing a scene has specified settings such as zoom (z1) and aperture size (a1). The camera also has a focus position (f1). From this information, the distance (D1) is able to be computed. In FIG. 2A, an image focused on the person with the sun blurred is shown. The distance from the camera to where the camera is focused is D1, which is at the person.

Figure 2B:
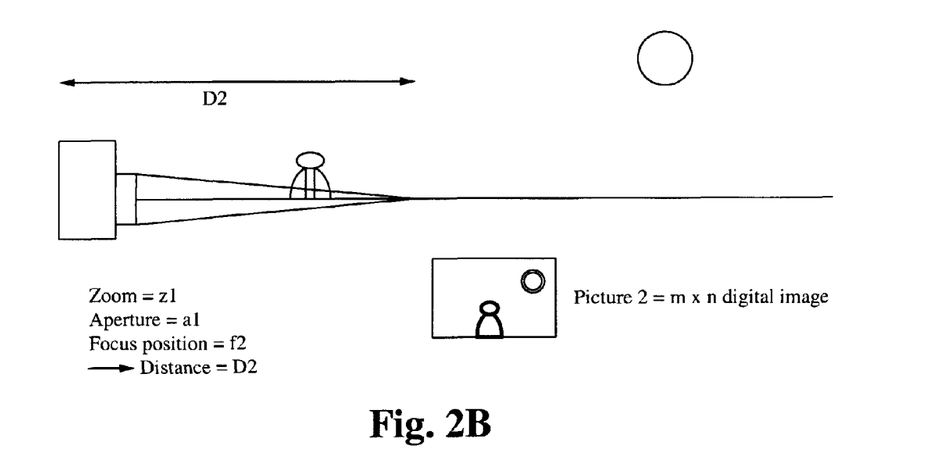

FIG. 2B illustrates a diagram of a camera acquiring a picture according to some embodiments. The zoom and aperture size are kept the same, but the focus position (f2) is changed. Then, from this information, the distance (D2) is able to be computed. In general, distance=function (zL, aL, fL). In FIG. 2B, in contrast to FIG. 2A, the image is focused closer to the sun, with the person blurred. The distance from the camera to where the camera is focused is D2, which is beyond the person. Thus, when comparing the images acquired in FIGS. 2A and 2B, one has a focused person and a blurred sun and the other has a blurred person and a less blurred sun. These images are able to be used to determine the distance of all objects in the image such as the person.

Figure 3A:
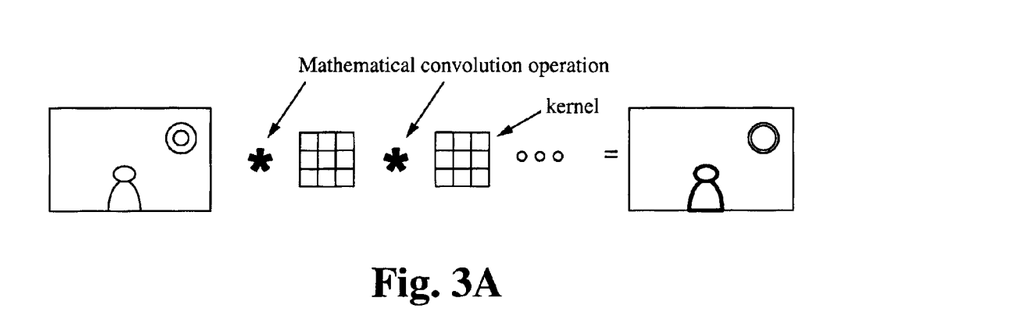
FIGS. 3A-B illustrate a diagram of using convolutions to affect the focus of a picture according to some embodiments.

FIG. 3A illustrates a diagram of using convolutions to affect the focus of a picture according to some embodiments. Two pictures are taken, for example, the first picture is initially focused on a person with the sun blurred, and the second picture is focused closer to the sun, with the person blurred. With a goal of blurring the person in the first picture the same as the person in the second picture, mathematical convolution operations are able to be applied. The convolutions are iterated and the closeness of the first picture and the second picture is checked after each iteration. Thus, each iteration blurs the person more. Eventually, the blurring will match, and blurring beyond that will result in the first picture being blurred more than the second picture. The number of convolutions is able to be recorded, such as M convolutions.

Figure 3B:
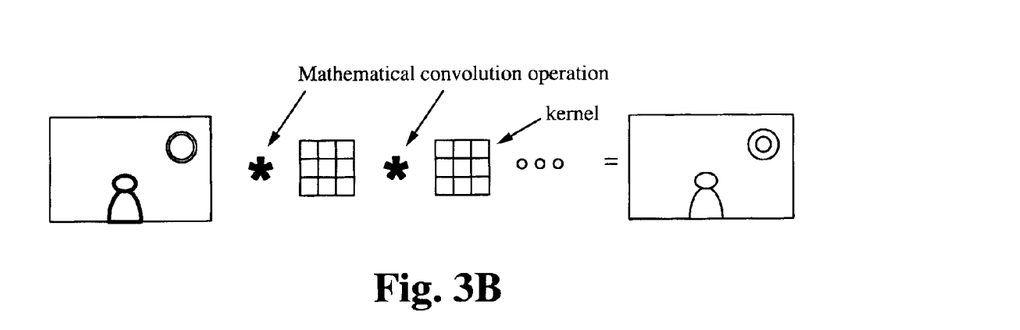

FIG. 3B illustrates a diagram of using convolutions to affect the focus of a picture according to some embodiments. Similar to the convolutions to blur the person in FIG. 3A, the sun is able to be blurred in N convolutions to achieve a matching blur.

Figure 4:
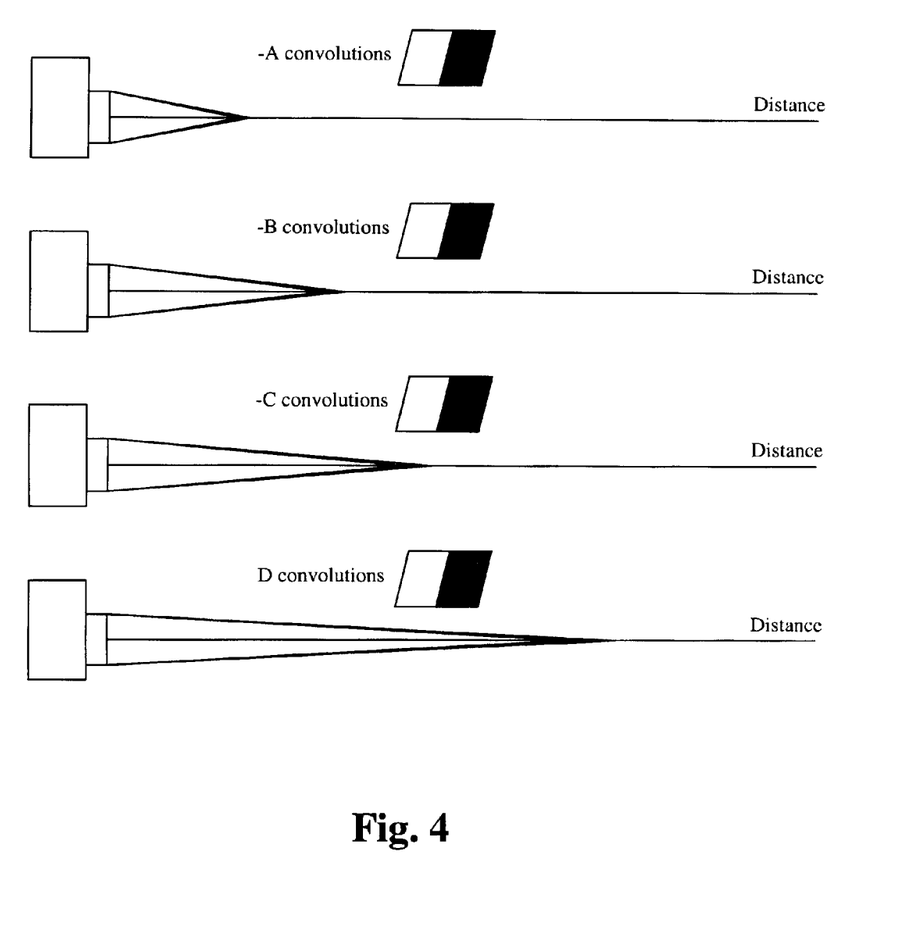
FIG. 4 illustrates a diagram of convolutions and distance according to some embodiments.
Figure 5:
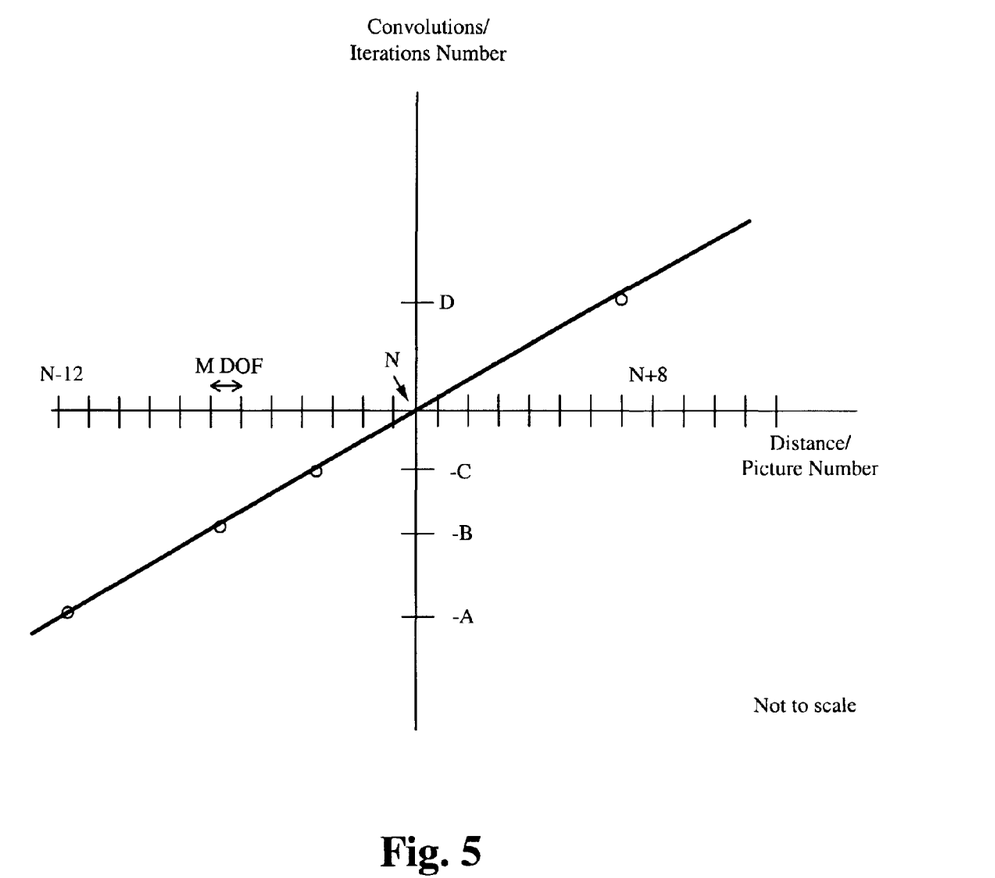
FIG. 5 illustrates a curve according to some embodiments.

FIG. 4 illustrates a diagram of convolutions and distance according to some embodiments. When the picture pair is taken beyond the focus point (e.g. the focus position of the test target), the sign of the convolution operator is positive, and when the picture pair is before the focus point, the sign is negative. In other words, when the picture pair is beyond the focus point, the second picture is more blurred than the first picture; thus, the convolution operator will be positive. However, when the picture pair is before the focus point, the first picture is more blurred than the second picture; thus, the convolution operator is negative. The sign indicates direction. This enables obtaining a sequence of numbers depending on where the picture pair is taken. As described in FIG. 1, a curve is able to be generated. Then, using picture pairs, convolutions related to the picture pairs and the generated curve, distances are able to be determined as shown in FIG. 5.

Figure 6:
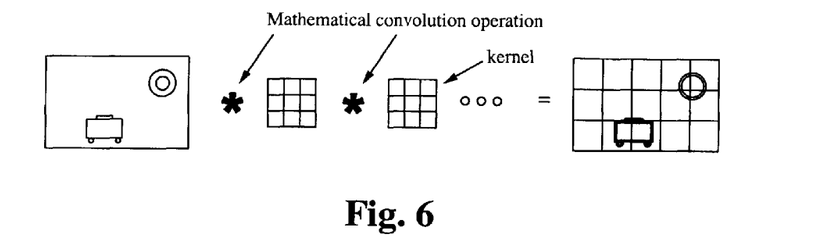
FIG. 6 illustrates an exemplary image and a set of convolutions to blur the image according to some embodiments.
Figure 7:
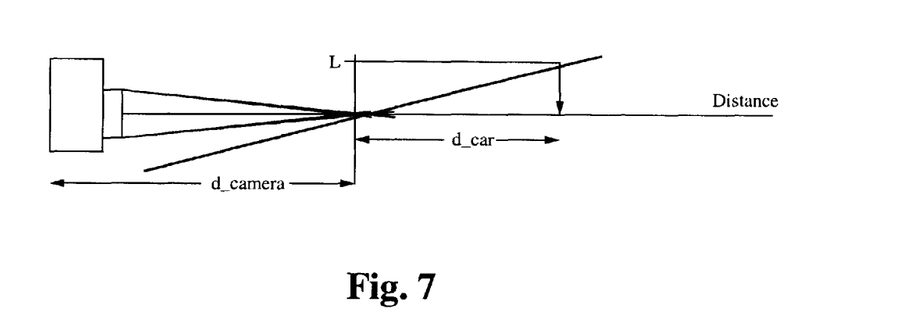
FIG. 7 illustrates a diagram for determining distances in an image according to some embodiments.

FIG. 6 illustrates an exemplary image and a set of convolutions to blur the image according to some embodiments. FIG. 7 illustrates a diagram for determining distances in an image according to some embodiments. The number of convolutions to blur the sharper car to the less sharp car of FIG. 6 is L convolutions. Then, using the curve, L convolutions results in a distance, d_car, for the car. The focus position is known; thus, the distance from the focus position to the car is able to be determined. The distance from the car to the camera is d_car+d_camera.

The curve is generated for each camera. In some embodiments, the curve is generated and stored on the camera when the camera is calibrated. In some embodiments, multiple curves are generated to improve performance. The slopes of the curves are possibly slightly different depending on a number of factors, such as where the camera is focused, so it is possible that one curve is more appropriate to use than another curve. In some embodiments, a curve is selected from the set of curves based on where the camera is focused. In some embodiments, the curve is selected based on another factor.

Figure 8:
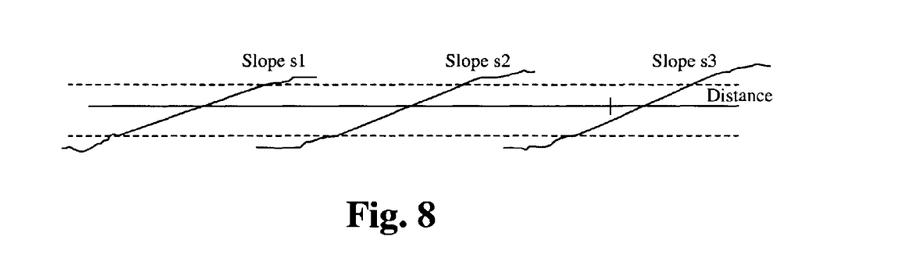
FIG. 8 illustrates a diagram of a series of curves according to some embodiments.

Acquiring a picture pair involves capturing two pictures with some fraction of depth of field separation. In some embodiments, the depth of field separation is a rational number. For example, the separation is 1 depth of field, two depths of field, one half of a depth of field or others. One or more curves are stored within a device such as a camera. FIG. 8 illustrates a diagram of a series of curves according to some embodiments. Then, the focus positions of the two pictures are used to determine which curve is appropriate, and what the distance is based on the curve. The curves are able to be modified if camera parameters are changed. Using the curves and the information described above, distances of objects in a picture, and a depth map, are able to be determined. The depth map is able to be determined by establishing distances for many objects in a scene which are then mapped out, thus generating the depth map. The curves are able to be stored in any data structure such as a lookup table.

Figure 9:
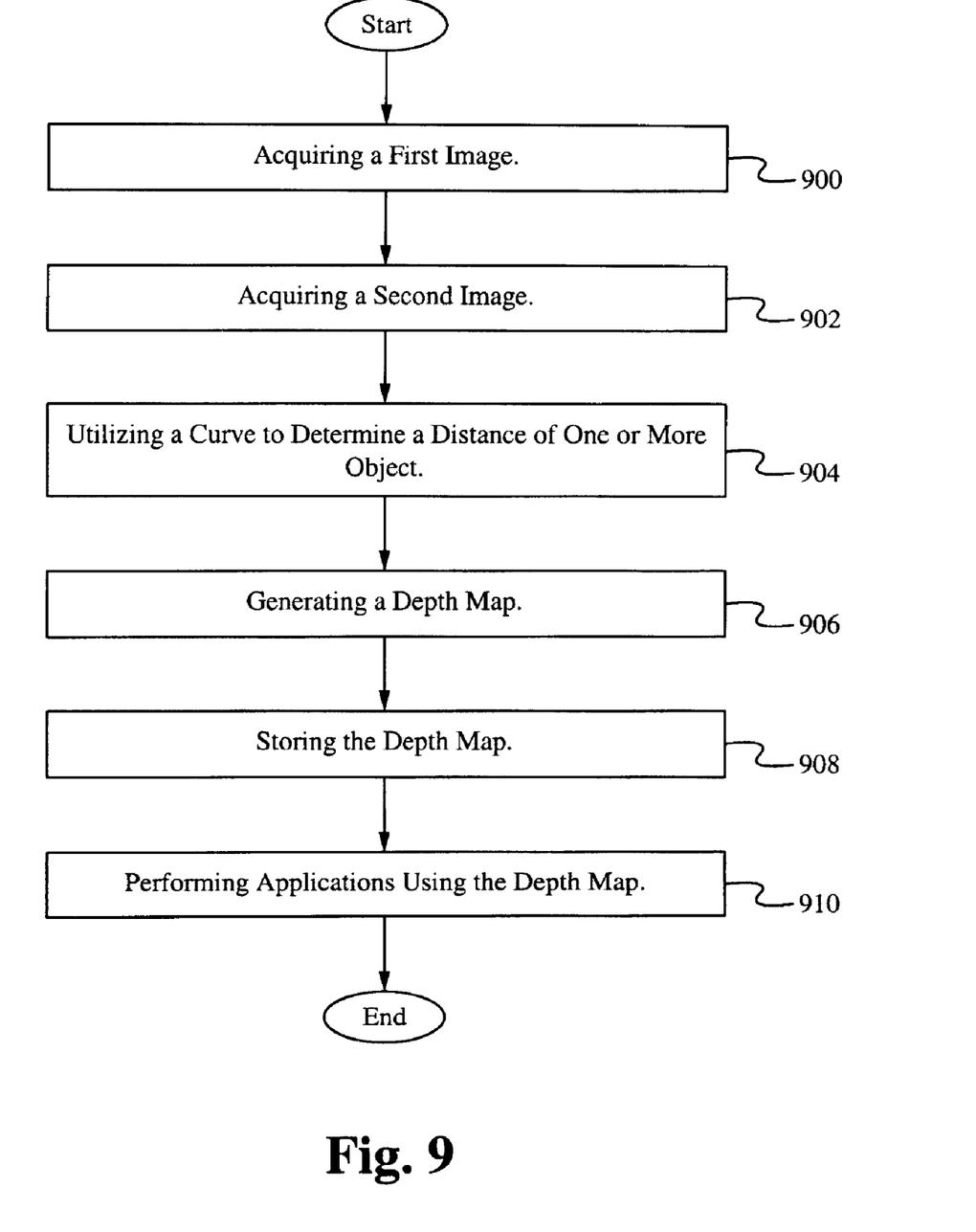
FIG. 9 illustrates a flowchart of a method of utilizing a device to determine object distances according to some embodiments.

FIG. 9 illustrates a flowchart of a method of utilizing a device to determine object distances according to some embodiments. In the step 900, a first image is acquired. In the step 902, a second image is acquired. The first image and the second image have different blur amounts. In the step 904, a determined curve is utilized to determine a distance of one or more objects in the acquired images. The distance is computed by determining the number of convolutions used to blur a sharper image (e.g. the first image) to a less sharp image (e.g. the second image), then using the number of convolutions to determine the distance from the object to the focus position (e.g. object-to-focus position distance) based on the curve (see FIG. 5). Since the focus position is known, the distance from the camera to the focus position (e.g. device-to-focus position distance) is able to be computed. Then, adding the distance from the camera to the focus position with the distance from the focus position to the object is the total distance of the object from the camera. In addition to calculating the distance of the object to the camera, relative object distance is also able to be computed. For example, if focus position to object distances are calculated for two separate objects, then those distances are able to be used to determine the relative object distance. The curve is determined by acquiring images of a target with different blur quantities, as described above. In some embodiments, a depth map is generated based on the determined distances, in the step 906. In some embodiments, the determined curve is determined and stored before the first image is acquired. In the step 908, the depth map is stored. In some embodiments, the depth map is not stored and the step 908 is able to be skipped. In the step 910, the depth map is utilized to perform applications such as those described below.

Figure 10:
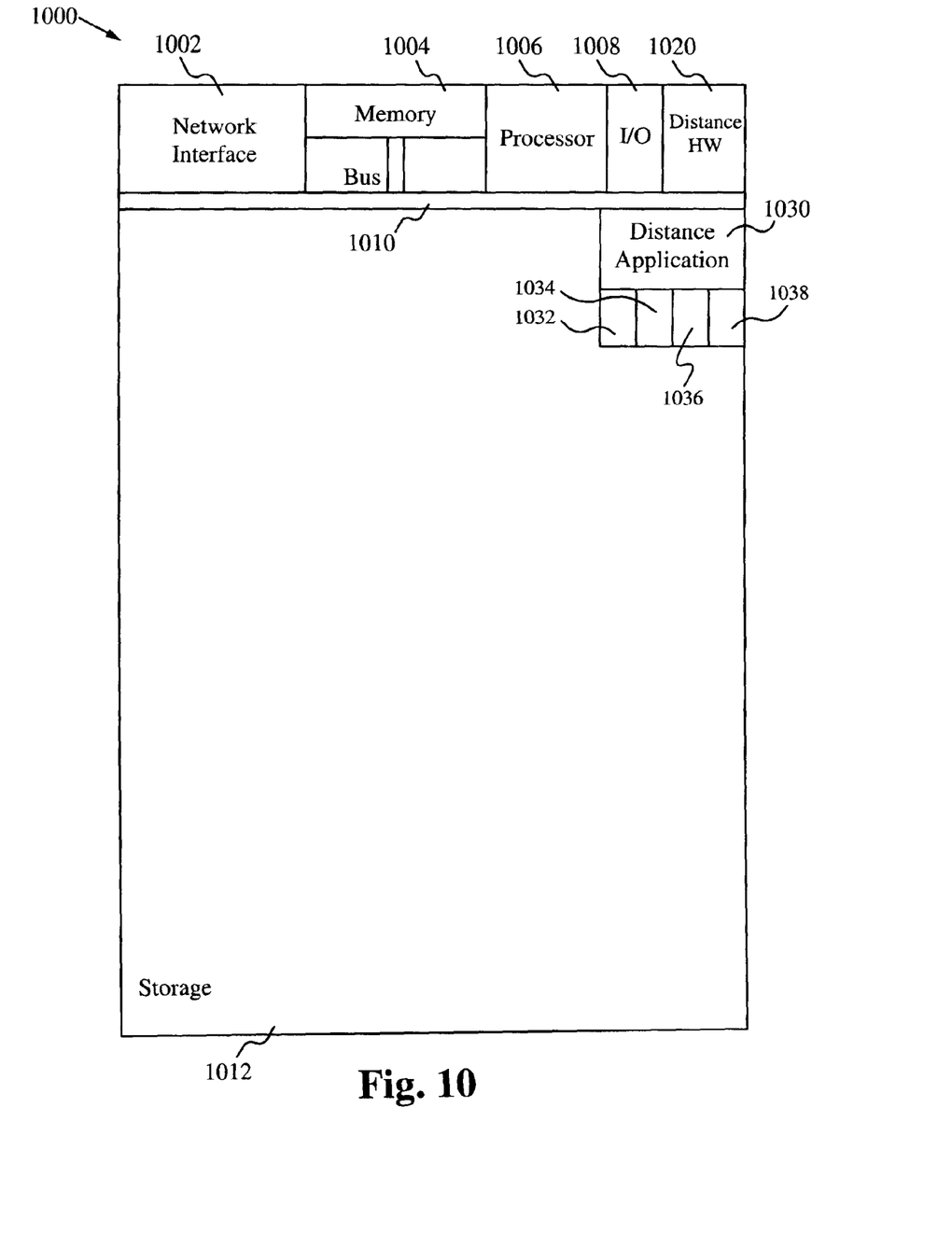
FIG. 10 illustrates a block diagram of an exemplary computing device configured for determining a object distances according to some embodiments.

FIG. 10 illustrates a block diagram of an exemplary computing device configured for determining distances of objects in an image according to some embodiments. The computing device 1000 is able to be used to acquire, store, compute, communicate and/or display information such as images and videos. For example, the computing device 1000 is able to acquire and store a picture, as well as use information from the acquired picture to perform calculations. In general, a hardware structure suitable for implementing the computing device 1000 includes a network interface 1002, a memory 1004, a processor 1006, I/O device(s) 1008, a bus 1010 and a storage device 1012. The choice of processor is not critical as long as a suitable processor with sufficient speed is chosen. The memory 1004 is able to be any conventional computer memory known in the art. The storage device 1012 is able to include a hard drive, CDROM, CDRW, DVD, DVDRW, flash memory card or any other storage device. The computing device 1000 is able to include one or more network interfaces 1002. An example of a network interface includes a network card connected to an Ethernet or other type of LAN. The I/O device(s) 1008 are able to include one or more of the following: keyboard, mouse, monitor, display, printer, modem, touchscreen, button interface and other devices. Distance application(s) 1030 used to perform the distance methods are likely to be stored in the storage device 1012 and memory 1004 and processed as applications are typically processed. More or less components shown in FIG. 10 are able to be included in the computing device 1000. In some embodiments, distance processing hardware 1020 is included. Although the computing device 1000 in FIG. 10 includes applications 1030 and hardware 1020 for distance applications, the distance applications are able to be implemented on a computing device in hardware, firmware, software or any combination thereof.

In some embodiments, the distance application(s) 1030 include several applications and/or modules. In some embodiments, the distance application(s) 1030 include an image/picture/video acquisition module 1032 configured for acquiring a multiple images/pictures/videos (e.g. a first image/picture/video and a second image/picture/video), a curve generation module 1034 configured for generating a curve, a distance calculation module 1036 configured for determining/calculating a distance of an object within the image/picture/video and a depth map generation module 1038 configured for generating a depth map.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an IPod®, a video player, a DVD writer/player, a television, a home entertainment system or any other suitable computing device.

To utilize the determined distances and depth map, some aspects of the applications are applicable at different stages of the imaging process. Before an image/video is acquired, the applications utilizing distances and/or a depth map are able to set parameters including, but not limited to, auto focus, auto exposure, zoom setting, aperture setting, flash setting and shutter speed. These applications are able to be automatically implemented or manually implemented by a user. Then, a user is able to acquire the image/video as he would acquire any image/video such as pointing at a target and pressing a button. While the image/video is being acquired, additional applications are able to affect the image including, but are not limited to, white balance, noise reduction, gamma correction, motion estimation and image/video compression. After the image/video is stored, post processing is able to occur. For example, the image is stored on the camera/camcorder or on another device such as a computer. Using an input mechanism, the user is able to perform post processing operations on the image/video. In some embodiments, the post processing occurs automatically without user input. Examples of image post processing, include but are not limited to, generating blur, quality improvement, generating a 3-D image, shadow removal and object segmentation. All of these steps are able to benefit from the distance information and the depth map.

In operation, determining distance information and/or a depth map using curve information and two or more images, image/video processing is able to be improved in a number of ways. The curve is generated using acquired image information. Then, by acquiring two or more images with different blur, the number of convolutions to blur a sharper image to a more blurred image is able to be recorded and then used with the curve to determine a distance (such as an object to focal position distance). The distance from the focal position to the camera is able to be calculated. These two distances together are the distance from the object to the camera or other device. Image acquisition is able to be improved by camera settings being configured appropriately before the image/video is acquired. Image processing of the acquired image is able to be improved. Post processing of the image is also able to be improved using the distance information as well. Improvements include more efficient processing, better quality images/videos, additional features and other improvements.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a memory of a device comprising:
   a. acquiring a first image of a scene;
   b. acquiring a second image of the scene; and
   c. utilizing curve information including multiple curves to determine a device-to-object distance of an object in the scene.

2. The method of claim 1 wherein the curve information is precalculated.

3. The method of claim 1 wherein utilizing the curve information includes:
   a. determining a number of convolutions used to blur one of the first image and the second image to a blurriness of the other of the first image and the second image;
   b. using the number of convolutions to determine an object-to-focus position distance based on the curve information;
   c. computing a device-to-focus position distance; and
   d. adding the object-to-focus position distance and the device-to-focus position distance to determine the device-to-object distance.

4. The method of claim 1 further comprising generating the curve information.

5. The method of claim 4 wherein generating the curve information includes acquiring multiple images at different blur quantities.

6. The method of claim 1 wherein the first image and the second image have a different blur amount.

7. The method of claim 6 wherein the different blur amount is achieved by changing the focus position between acquiring the first image and the second image.

8. The method of claim 1 further comprising generating a depth map.

9. The method of claim 8 further comprising storing the depth map.

10. The method of claim 9 further comprising utilizing the depth map to perform an application.

11. The method of claim 10 wherein the application is selected from the group consisting of auto focus, auto exposure, zoom setting, aperture setting, flash setting, shutter speed, white balance, noise reduction, gamma correction, motion estimation, image/video compression, generating blur, quality improvement, generating a 3-D image, shadow removal and object segmentation.

12. The method of claim 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a portable music player, a video player, a DVD writer/player, a television and a home entertainment system.

13. A system implemented on a device configured for determining distances of objects in an image, the system comprising:
   a. an image acquisition module configured for acquiring a first image and a second image;
   b. a curve generation module operatively coupled to the image acquisition module, the curve generation module configured for generating curve information including multiple curves; and
   c. a distance calculation module operatively coupled to the curve generation module, the distance calculation module configured for calculating a device-to-object distance of an object within the image.

14. The system of claim 13 wherein the distance calculation module utilizes the curve information by:
   a. determining a number of convolutions used to blur one of the first image and the second image to a blurriness of the other of the first image and the second image;
   b. using the number of convolutions to determine an object-to-focus position distance based on the curve information;
   c. computing a device-to-focus position distance; and
   d. adding the object-to-focus position distance and the device-to-focus position distance to determine the device-to-object distance.

15. The system of claim 13 wherein the curve information is determined by acquiring target data of multiple images at different blur quantities.

16. The system of claim 13 wherein the first image and the second image have a different blur amount.

17. The system of claim 16 wherein the different blur amount is achieved by changing the focus position between acquiring the first image and the second image.

18. The system of claim 13 further comprising a depth map generation module operatively coupled to the distance calculation module, the depth map generation module configured for generating a depth map.

19. The system of claim 18 wherein the depth map is stored.

20. The system of claim 19 wherein the depth map is utilized to perform an application.

21. The system of claim 20 wherein the application is selected from the group consisting of auto focus, auto exposure, zoom setting, aperture setting, flash setting, shutter speed, white balance, noise reduction, gamma correction, motion estimation, image/video compression, generating blur, quality improvement, generating a 3-D image, shadow removal and object segmentation.

22. The system of claim 13 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a portable music player, a video player, a DVD writer/player, a television and a home entertainment system.

23. A device comprising:
   a. a memory for storing an application, the application configured for:
      i. acquiring a first image of a scene;
      ii. acquiring a second image of the scene; and
      iii. utilizing curve information including multiple curves to determine a distance of one or more objects in the scene; and
   b. a processing component coupled to the memory, the processing component configured for processing the application.

24. The device of claim 23 wherein utilizing the curve information includes:
   a. determining a number of convolutions used to blur one of the first image and the second image to a blurriness of the other of the first image and the second image;
   b. using the number of convolutions to determine an object-to-focus position distance based on the curve information;
   c. computing a device-to-focus position distance; and
   d. adding the object-to-focus position distance and the device-to-focus position distance to determine the device-to-object distance.

25. The device of claim 23 wherein the curve information is predetermined.

26. The device of claim 23 wherein the application is further configured for generating the curve information.

27. The device of claim 26 wherein generating the curve information includes acquiring multiple images at different blur quantities.

28. The device of claim 23 wherein the first image and the second image have a different blur amount.

29. The device of claim 28 wherein the different blur amount is achieved by changing the focus position between acquiring the first image and the second image.

30. The device of claim 23 wherein the application is further configured for generating a depth map.

31. The device of claim 30 wherein the depth map is stored.

32. The device of claim 31 wherein the application is further configured for utilizing the depth map to perform an imaging application.

33. The device of claim 32 wherein the imaging application is selected from the group consisting of auto focus, auto exposure, zoom setting, aperture setting, flash setting, shutter speed, white balance, noise reduction, gamma correction, motion estimation, image/video compression, generating blur, quality improvement, generating a 3-D image, shadow removal and object segmentation.

34. The device of claim 23 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a portable music player, a video player, a DVD writer/player, a television and a home entertainment system.

35. A method programmed in a memory of a device comprising:
   a. acquiring a first image of a scene;
   b. acquiring a second image of the scene; and
   c. utilizing precalculated curve information to determine a device-to-object distance of an object in the scene.

36. A device comprising:
   a. a memory for storing an application, the application configured for:
      i. acquiring a first image of a scene;
      ii. acquiring a second image of the scene; and
      iii. utilizing precalculated curve information to determine a distance of one or more objects in the scene; and
   b. a processing component coupled to the memory, the processing component configured for processing the application.

37. A method programmed in a memory of a device comprising:
   a. acquiring a first image of a scene;
   b. acquiring a second image of the scene;
   c. utilizing curve information to determine a device-to-object distance of an object in the scene; and
   d. generating a depth map.

38. A device comprising:
   a. a memory for storing an application, the application configured for:
      i. acquiring a first image of a scene;
      ii. acquiring a second image of the scene;
      iii. utilizing curve information to determine a distance of one or more objects in the scene; and
      iv. generating a depth map; and b. a processing component coupled to the memory, the processing component configured for processing the application.

39. A method programmed in a memory of a device comprising:
 a. acquiring a first image of a scene;
 b. acquiring a second image of the scene; and
 c. utilizing curve information to determine a device-to-object distance of an object in the scene, wherein utilizing the curve information includes:
   i. determining a number of convolutions used to blur one of the first image and the second image to a blurriness of the other of the first image and the second image;
   ii. using the number of convolutions to determine an object-to-focus position distance based on the curve information;
   iii. computing a device-to-focus position distance; and
   iv. adding the object-to-focus position distance and the device-to-focus position distance to determine the device-to-object distance.

40. A device comprising:
 a. a memory for storing an application, the application configured for:
   i. acquiring a first image of a scene;
   ii. acquiring a second image of the scene; and
   iii. utilizing curve information to determine a distance of one or more objects in the scene, wherein utilizing the curve information includes:
     (1) determining a number of convolutions used to blur one of the first image and the second image to a blurriness of the other of the first image and the second image;
     (2) using the number of convolutions to determine an object-to-focus position distance based on the curve information;
     (3) computing a device-to-focus position distance; and
     (4) adding the object-to-focus position distance and the device-to-focus position distance to determine the device-to-object distance; and
 b. a processing component coupled to the memory, the processing component configured for processing the application.

* * * * *